(12) United States Patent
Laycock et al.

(10) Patent No.: US 10,476,591 B2
(45) Date of Patent: Nov. 12, 2019

(54) FREE SPACE OPTICAL COMMUNICATION SYSTEM RECEIVER

(71) Applicant: BAE SYSTEMS plc, London (GB)

(72) Inventors: Leslie Charles Laycock, Chelmsford Essex (GB); Andrew James Williams, Chelmsford Essex (GB); Michael Stewart Griffith, Chelmsford Essex (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/309,333

(22) PCT Filed: Jun. 9, 2017

(86) PCT No.: PCT/GB2017/051690
§ 371 (c)(1),
(2) Date: Dec. 12, 2018

(87) PCT Pub. No.: WO2017/216526
PCT Pub. Date: Dec. 21, 2017

(65) Prior Publication Data
US 2019/0260472 A1 Aug. 22, 2019

(30) Foreign Application Priority Data
Jun. 13, 2016 (EP) ..................................... 16174269
Jun. 13, 2016 (GB) ..................................... 1610268.3

(51) Int. Cl.
*H04B 10/112* (2013.01)
(52) U.S. Cl.
CPC ................................. *H04B 10/112* (2013.01)
(58) Field of Classification Search
None
See application file for complete search history.

(56) References Cited

U.S. PATENT DOCUMENTS

| 4,995,101 A * | 2/1991 | Titterton | H04B 10/11 342/45 |
| 5,349,176 A * | 9/1994 | Czichy | G01S 3/781 250/206.2 |

(Continued)

FOREIGN PATENT DOCUMENTS

| EP | 1284431 A1 | 2/2003 |
| JP | 2004356890 A | 12/2004 |
| WO | 2017216526 A1 | 12/2017 |

OTHER PUBLICATIONS

International Search Report and Written Opinion received for PCT Application No. PCT/GB2017/051690, dated Sep. 8, 2017. 12 pages.

(Continued)

*Primary Examiner* — David W Lambert
(74) *Attorney, Agent, or Firm* — Finch & Maloney PLLC

(57) ABSTRACT

A free space optical communication system receiver (500) comprising: a central optical sensor (600); and a plurality of further optical sensors (601-604) disposed around a peripheral edge of the central optical sensor (600). The free space optical communication system receiver (500) may be coupled to means for moving the free space optical communication system receiver (500) relative to an incoming optical signal (510). A controller (508) may be configured to, using measurements of the incident optical signal (510) by the plurality of further optical sensors (601-604), control the means so as to move the free space optical communication system receiver (500) relative to the incident optical signal (510).

17 Claims, 6 Drawing Sheets

(56) References Cited

U.S. PATENT DOCUMENTS

| | | | |
|---|---|---|---|
| 5,790,291 A | 8/1998 | Britz | |
| 5,953,146 A * | 9/1999 | Shelby | H04B 10/11 398/131 |
| 6,381,055 B1 | 4/2002 | Javitt et al. | |
| 6,493,490 B1 * | 12/2002 | Steiger | G02B 6/422 356/400 |
| 7,689,127 B1 | 3/2010 | Beffa | |
| 2007/0280694 A1 | 12/2007 | Yasumoto et al. | |
| 2013/0082162 A1 | 4/2013 | Eide | |
| 2014/0161466 A1 * | 6/2014 | Riza | H04B 10/1149 398/119 |
| 2017/0054499 A1 * | 2/2017 | Graves | H04B 10/11 |

OTHER PUBLICATIONS

GB Search Report received for GB Application No. 16102683, dated Dec. 21, 2016. 6 pages.

Extended European Search Report received for EP Application Mo. 16174269.7, dated Dec. 1, 2016. 7 pages.

International Preliminary Report on Patentability received for PCT Application No. PCT/GB2017/051690, dated Dec. 27, 2018. 8 pages.

* cited by examiner

FREE SPACE OPTICAL COMMUNICATION SYSTEM RECEIVER

FIELD OF THE INVENTION

The present invention relates to free space optical communication system receivers.

BACKGROUND

FIG. 1 is a schematic illustration (not to scale) showing an example of a conventional free space optical communication (FSO) receiver system 100 with fine tracking control.

This type of FSO receiver system is typically associated with a communications receiver on a mobile platform, for example, a ground vehicle, aircraft, or ship. This type of FSO receiver system is typically implemented to mitigate against shake and jitter generated by vehicle movement which can lead to signal drop-out.

In this example, the FSO receiver system 100 comprises a tip-tilt mirror 102, a beam splitter 104, a focussing lens 106, an optical receiver 108, a Fourier transform lens 110, a quad tracking sensor 112, and a tracking controller 114.

In operation, a light beam 116 is incident on the system 100. The light beam 116 is an optical communications signal specifying communications data. The received light beam 116 is incident on the tip-tilt mirror 102. The tip-tilt mirror 102 reflects the incident light beam 116 onto the beam splitter 104. The beam splitter 104 then splits the received light beam 116 into two separate beams, namely a first beam 118 and a second beam 120. In some examples, the second beam 120 may be a relatively small fraction (for example 10%) of the light beam 116, and the first beam 118 may be the remainder.

The first beam 118 is directed by the beam splitter 104 onto the focussing lens 106. The focussing lens 106 focuses the first beam 118 (thereby to produce the first focussed beam 122) onto the optical receiver 108. The optical receiver 108 measures the first focussed beam 122, thereby determining the communications data.

The second beam 120 is directed by the beam splitter 104 onto the Fourier transform lens 110. The Fourier transform lens 110 focuses the second beam 120 (thereby to produce the second focussed beam 124) onto the quad tracking sensor 112. The quad tracking sensor 112 measures the second focussed beam 124.

The quad tracking sensor 112 is described in more detail later below with reference to FIG. 4. In this example, the quad tracking sensor 112 is an angle-of-arrival sensor that is axially aligned with the optical receiver 108. In this example, the quad tracking sensor 112 comprises four optical sensors, hereinafter referred to as "quadrant sensors". The quad tracking sensor 112 is coupled to the tracking controller 114 such that an output of the quad tracking sensor 112 is sent to the tracking controller 114.

The tracking controller 114 is configured to, using the received output of the quad tracking sensor 112, control the tip-tilt mirror 102. In particular, in this example, the tracking controller 114 implements a tracking control algorithm to periodically update the power of the portion of the second focussed beam 124 detected on each of the quadrant sensors of the quad tracking sensor 112. Using this information, the tracking controller 114 periodically determines the position of the point on the quad tracking sensor 112 to which the second focussed beam 124 is focussed, or the offset error of this point from a centre of the quad tracking sensor 112. The tracking controller 114 then uses this positional information to periodically determine a corrective angular movement for the tip-tilt mirror 102 that would cause the second focussed beam 124 to be focussed at the centre of the quad tracking sensor 112 (i.e. to cause the point on the quad tracking sensor 112 at which the second focussed beam 124 is focussed to move to the centre of the quad tracking sensor 112). This process may be referred to as centroiding.

The tracking controller 114 then periodically controls the tip-tilt mirror 102 as determined, thereby causing the second focussed beam 124 to be focussed at the centre of the quad tracking sensor 112. As the quad tracking sensor 112 is axially aligned with the optical receiver 108, this movement of the tip-tilt mirror 102 tends to cause the first focussed beam 122 to be focussed at a desired point (e.g. a centre) of the optical receiver 108.

Thus, the tip-tilt mirror 102 is periodically controlled such that the optical receiver 108 receives an optical signal (i.e. the first focussed beam 122) at a substantially optimum position, thereby reducing signal drop out.

FIG. 2 is a schematic illustration (not to scale) showing a top view of a portion of an alternative example conventional FSO receiver system with fine tracking control.

FIG. 3 is a schematic illustration (not to scale) showing a side view of the portion of the alternative example conventional FSO receiver system shown in FIG. 2.

In this example, the beam splitter (not shown in FIGS. 2 and 3) is configured to split a received light beam into the first and second light beams 118, 120 such that the first and second light beams 118, 120 are substantially parallel to each other.

In this example, the focussing lens 106, the optical receiver 108, the Fourier transform lens 110, and the quad tracking sensor 112 are fixed to a fixture 200.

The focussing lens 106 and the Fourier transform lens 110 are positioned aligned and side-by-side on an upper surface of the fixture 200. Similarly the optical receiver 108 and the quad tracking sensor 112 are positioned aligned and side-by-side on the upper surface of the fixture 200.

The focussing lens 106 and the optical receiver 108 are arranged on the fixture 200 such the focussing lens 106 focuses the first beam 118 onto the optical receiver 108. Similarly, the Fourier transform lens 110 and the quad tracking sensor 112 are arranged on the fixture 200 such the Fourier transform lens 110 focuses the second beam 120 onto the quad tracking sensor 112.

In a similar way to that performed in the first example described in more detail earlier above with reference to FIG. 1, in this example, the tracking controller (not shown in FIGS. 2 and 3) uses an output of the quad tracking sensor 112 to control pan and tilt movement of the fixture 200. This pan and tilt movement is illustrated in FIG. 3 by double-headed arrows and the reference numerals 300 and 302 respectively.

In particular, in this example, the tracking controller implements a tracking control algorithm to continuously or periodically update the power of the portion of the second focussed beam 124 detected on each of the quadrant sensors of the quad tracking sensor 112. Using this information, the tracking controller determines the position of the point on the quad tracking sensor 112 to which the second focussed beam 124 is focussed, or the offset error of this point from a centre of the quad tracking sensor 112. The tracking controller then uses this positional information to determine a corrective pan/tilt movement 300, 302 for the fixture 200 to cause the second focussed beam 124 to be focussed at the centre of the quad tracking sensor 112.

FIG. 4 is a schematic illustration (not to scale) showing certain details of a front surface of the quad tracking sensor 112.

In this example, the quad tracking sensor 112 comprises four optical sensors, namely a first quadrant sensor 401, a second quadrant sensor 402, a third quadrant sensor 403, and a fourth quadrant sensor 404.

In this example, the front surface of the quad tracking sensor 112 is substantially circular. Each quadrant sensor 401-404 forms a respective quarter of the circular front surface of the quad tracking sensor 112. In this example, the quadrant sensors 401-404 are substantially the same shape as each other. In this example, the quadrant sensors 401-404 are substantially the same size as each other.

Each quadrant sensor 401-404 is configured to measure the power of the portion of the second focussed beam 124 that is incident on it.

The tracking controller 114 is configured to determine the position of the point on the quad tracking sensor 112 onto which the second focussed beam 124 is focussed (and/or the offset error of this point from the centre of the quad tracking sensor 112) using the respective power measurements taken by the quadrant sensors 401-404.

SUMMARY OF THE INVENTION

The present inventors have realised that in conventional FSO receiver systems, there is additional size, weight, and complexity associated with the angle-of-arrival sensor (i.e. the quad tracking sensor 112 in the examples described above with reference to FIGS. 1 to 4). The present inventors have realised it would be beneficial to avoid the use of a separate, independent angle-of-arrival sensor. The present inventors have realised that this would reduce the size, weight, and complexity of an FSO receiver system.

In a first aspect, the present invention provides a free space optical communication system receiver comprising a central optical sensor, and a plurality of further optical sensors disposed around a peripheral edge of the central optical sensor.

The plurality of further optical sensors may be uniformly spaced apart around the peripheral edge of the central optical sensor. The further optical sensors may be the same size and shape as each other. The central optical sensor may be substantially circular. The further optical sensors may define an annulus surrounding the central optical sensor. There may be at least four further optical sensors.

In a further aspect, the present invention provides a free space optical communication system comprising: a free space optical communication system receiver according to any preceding aspect; means for moving the free space optical communication system receiver relative to an optical signal incident on the free space optical communication system; and a controller configured to, using measurements of the incident optical signal by the plurality of further optical sensors, control the means so as to move the free space optical communication system receiver relative to the incident optical signal.

The means for moving the free space optical communication system receiver may comprise a rigid support structure rotatable about at least two perpendicular axes. The free space optical communication system receiver may be fixedly attached to the support structure. The controller may be configured to, using the measurements of the incident optical signal by the plurality of further optical sensors, rotate the support structure about at least one of the axes.

The system may further comprise a lens configured to focus the incident optical signal onto the free space optical communication system receiver. The lens may be a lens selected from the group of lenses consisting of: a bi-focal lens, a Fresnel lens, a diffractive lens, a holographic element, a combination refractive and diffractive lenses, and a Kinoform. The lens may be programmable and/or adaptive.

In a further aspect, the present invention provides a method of receiving an optical signal. The method comprises: providing a free space optical communication system receiver, the free space optical communication system receiver comprising: a central optical sensor; and a plurality of further optical sensors disposed around a peripheral edge of the central optical sensor; measuring, by one or more of the further optical sensors, at least a portion of an optical signal incident on the free space optical communication system receiver; and, using the one or more measurements taken by the one or more of further optical sensors, moving the free space optical communication system receiver relative to the incident optical signal.

Moving the free space optical communication system receiver relative to the incident optical signal may be performed such that the central optical sensor is moved towards the incident optical signal.

The incident optical signal may specify communications data. The method may further comprise measuring, by the central optical sensor, at least a portion of an optical signal incident on the central optical sensor thereby to determine the communications data.

In a further aspect, the present invention provides a method of providing a free space optical communication system receiver. The method comprises providing a central optical sensor, and disposing a plurality of further optical sensors around a peripheral edge of the central optical sensor.

DETAILED DESCRIPTION

Figure 5:
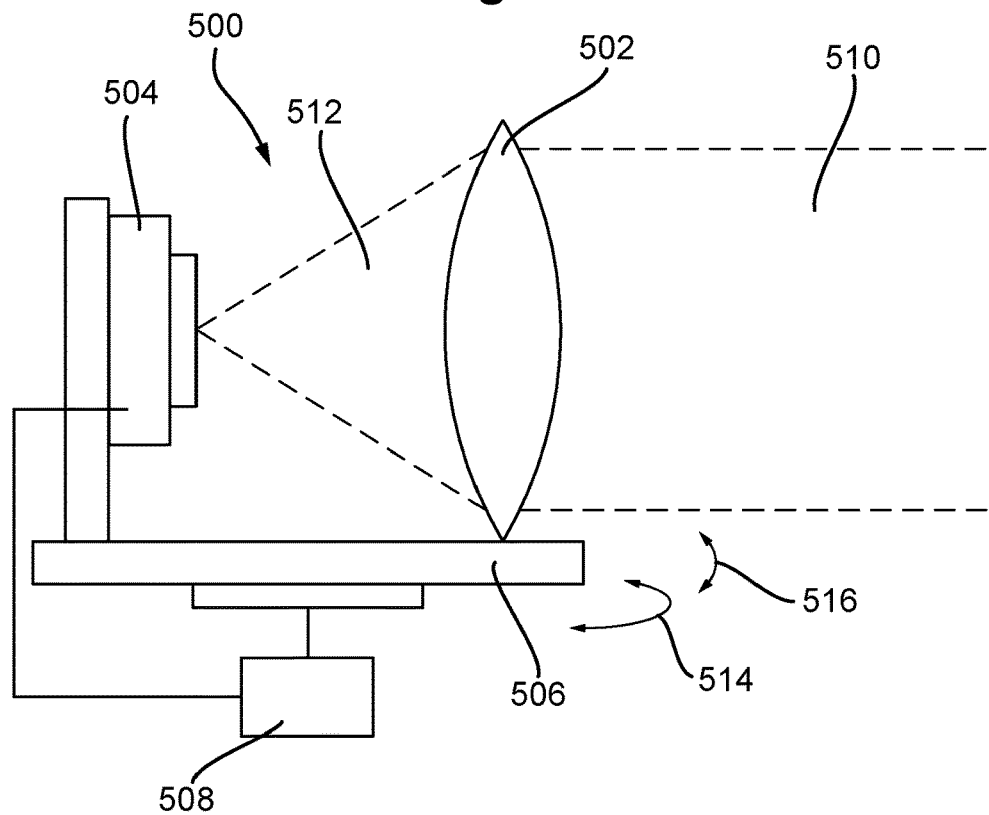
FIG. 5 is a schematic illustration (not to scale) showing an FSO receiver system.

FIG. 5 is a schematic illustration (not to scale) showing an embodiment of a FSO receiver system 500 with fine tracking control.

The FSO receiver system 500 may be used as a communications receiver on a mobile platform, for example, a ground vehicle, aircraft, or ship. Advantageously, the FSO receiver system 500 may be used to mitigate against shake and jitter generated by vehicle movement, thereby reducing the likelihood of signal drop-out.

In this embodiment, the FSO receiver system 500 comprises a focussing lens 502, a multifunctional sensor 504, a fixture 506, and a controller 508.

The focussing lens 502 and the multifunctional sensor 504 are fixed to an upper surface of the fixture 506.

The focussing lens 502 is configured to focus an incident light beam 510 (thereby to produce a focussed light beam 512) onto the multifunctional sensor 504. In some embodiments, the incident light beam, 510 is focussed to produce, on the multifunctional sensor 504, a focussed spot of light with a predetermined diameter.

The multifunctional sensor 504 is described in more detail later below with reference to FIG. 6. The multifunctional sensor 504 is coupled to the controller 508 such that an output of the multifunctional sensor 504 may be received by the controller 508.

The fixture 506 is a rigid support structure to which the focussing lens 502 and the multifunctional sensor 504 are mounted. In this embodiment, the fixture 506 may be rotated about two of its axes such that pan and tilt movement of the fixture 506 (relative to the incident light beam 510) is possible. This possible pan and tilt movement of the fixture 506 is illustrated in FIG. 5 by double headed arrows and the reference numerals 514 and 516 respectively.

In addition to being coupled to the multifunction sensor 504, the controller 508 is coupled to the fixture 506 such that the controller 508 may control movement of the fixture 506. As described in more detail later below with reference to FIG. 7, the controller 508 controls pan and tilt movement 514, 516 of the fixture 506 using the received output from the multifunctional sensor 504.

Figure 6:
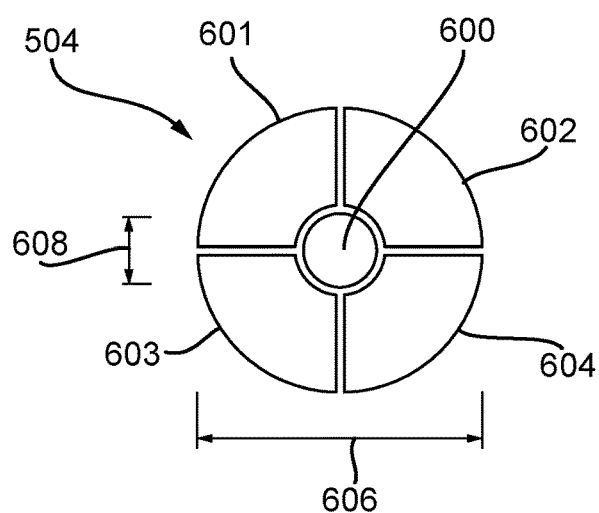
FIG. 6 is a schematic illustration (not to scale) showing certain details of a front surface of a multifunction sensor of the FSO receiver system.

FIG. 6 is a schematic illustration (not to scale) showing certain details of a front surface of the multifunction sensor 504.

In this embodiment, the multifunction sensor 504 comprises five optical sensors, namely a "central sensor" 600 and four so-called "quadrant sensors": a first quadrant sensor 601, a second quadrant sensor 602, a third quadrant sensor 603, and a fourth quadrant sensor 604.

In this embodiment, the front surface of the multifunction sensor 504 is substantially circular. However, in other embodiments, the multifunction sensor 504 may be a different shape other than circular. In this embodiment, the outer diameter 606 of the multifunction sensor 504 is approximately 1.6 mm. However, in other embodiments, the outer diameter 606 or a different dimension of the multi-function sensor 504 may be a different value.

The shape of the central sensor 600 at front surface of the multifunction sensor 504 is substantially circular. However, in other embodiments, the central sensor 600 may be a different shape other than circular. In this embodiment, the diameter 608 of the central sensor 600 is approximately 0.4 mm, i.e. approximately 25% of the outer diameter 606 of the multifunction sensor 504. However, in other embodiments, the diameter 608 or a different dimension of the central sensor 600 may be a different value.

In this embodiment, the circle defined by the outer edge of the quadrant sensors 601-604 (i.e. the circumference of the multifunction sensor 504) and the circle defined by the central sensor 600 are concentric. However, in other embodiments, the circle defined by the outer edge of the quadrant sensors 601-604 and the central sensor 600 are not concentric.

In this embodiment, on the front surface of the multifunction sensor 504, the quadrant sensors 601-604 are spaced apart around the outer edge, or periphery, of the central sensor 600 such that the quadrant sensors 601-604 substantially completely surround the central sensor 600. The quadrant sensors 601-604 define an annulus surrounding the central sensor 600. Each quadrant sensor 601-604 forms a respective quarter of the annulus. In this embodiment, the quadrant sensors 601-604 are substantially the same shape. In this embodiment, the quadrant sensors 601-604 are substantially the same size. However, in other embodiments, one or more quadrant sensors may have a different size and/or shape to one or more other quadrant sensors. Each quadrant sensor 601-604 is configured to measure the power of the portion of the focussed beam 512 that is incident on that quadrant sensor 601-604.

In other embodiments, there is a different number of quadrant sensors, for example, there may be more than four (e.g. five, six . . . ) optical sensors positioned around the peripheral edge of the central sensor 600.

The central sensor 600 and each of the quadrant sensors 601-604 are coupled to the controller 508 such that a respective output of each of the central sensor 600, the first quadrant sensor 601, the second quadrant sensor 602, the third quadrant sensor 603, and the fourth quadrant sensor 604 may be received by the controller 508.

Apparatus, including the controller 508, for implementing the above arrangement, and performing the method steps to be described later below, may be provided by configuring or adapting any suitable apparatus, for example signal amplifiers, one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 7:
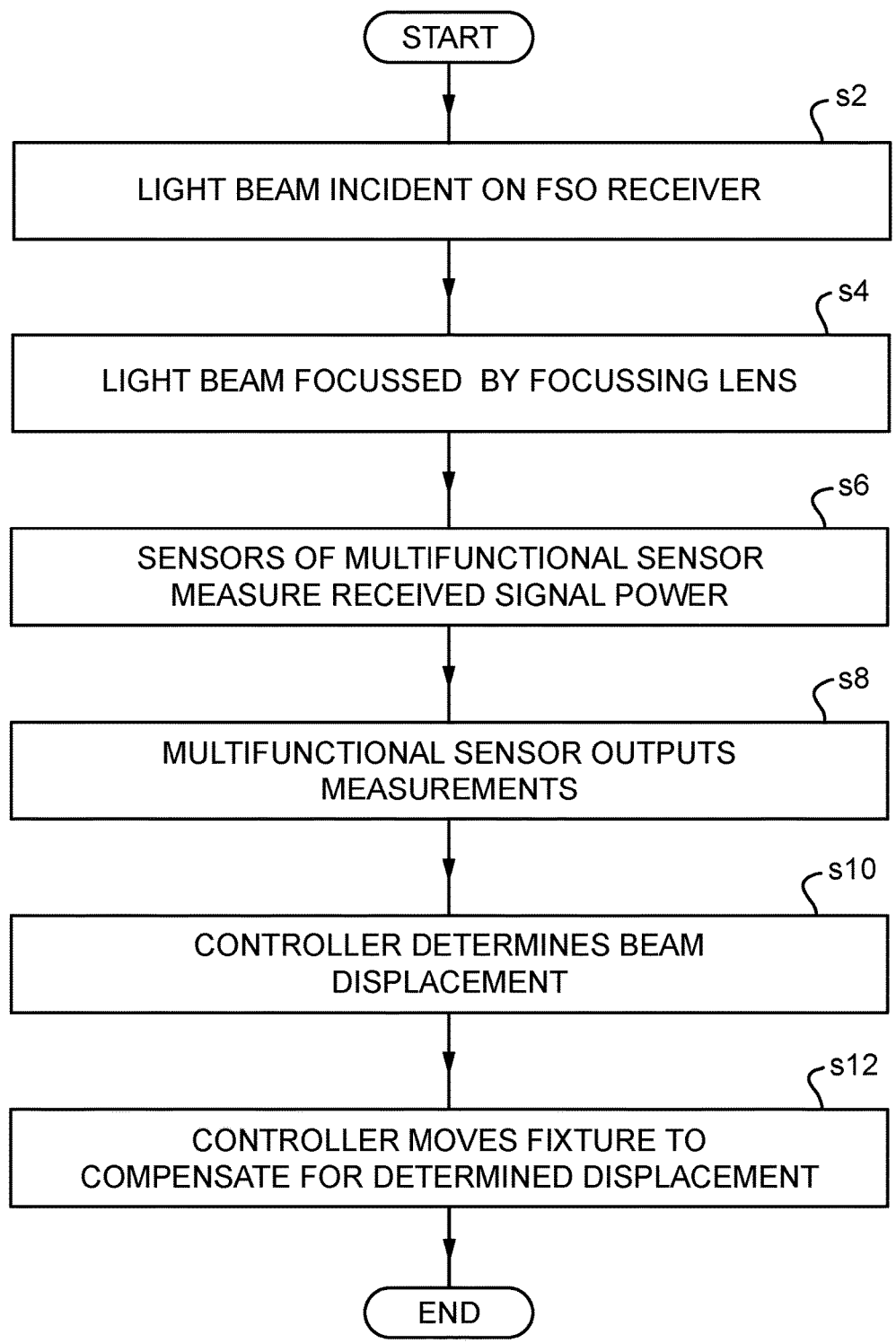
FIG. 7 is a process flow chart showing certain steps of an optical communications process implemented by the FSO receiver system.

FIG. 7 is a process flow chart showing certain steps of an embodiment of an optical communications process implemented by the FSO receiver system 500.

At step s2, the light beam 510 (which may be a laser beam) is incident on the FSO receiver system 500. The light beam 510 is an optical communications signal specifying communications data.

At step s4, the light beam 510 is focussed by the focussing lens 502 (to produce the focussed beam 512) onto the multifunctional sensor 504.

Figure 8:
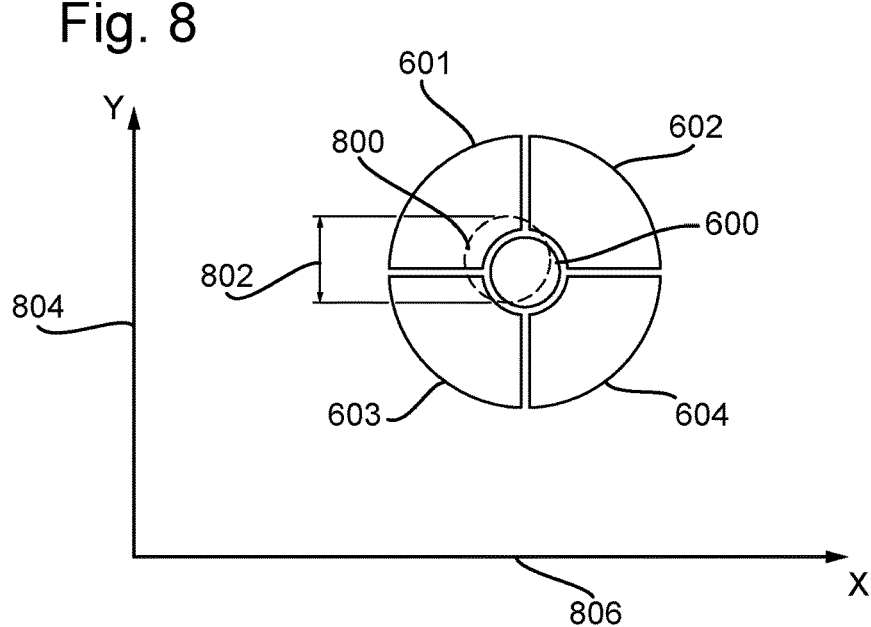
FIG. 8 is a schematic illustration (not to scale) showing the front surface of the multifunctional sensor in use.

FIG. 8 is a schematic illustration (not to scale) showing the front surface, or focal plane, of the multifunctional sensor 504 with the focussed beam 512 focussed thereon.

The focussed beam 512 may generate an Airy pattern in the focal plane of the receiving multifunctional sensor 504, i.e. on the front surface of the multifunctional sensor 504. This Airy pattern may be approximated by a Gaussian intensity profile. The $1/e^2$ diameter of the Gaussian intensity profile is where the intensity profile has dropped to $1/e^2$ of its peak intensity value. The power contained within this diameter is approximately 86%. For simplification, the portion of the focussed beam 512 on the front surface of the multifunctional sensor 504 that corresponds to the $1/e^2$ diameter of the Gaussian intensity profile will be hereinafter referred to as the "spot" and indicated in the Figures by the reference numeral 800. Also, the 1/e² diameter of the Gaussian intensity profile will be hereinafter referred to as the "beam diameter" and indicated in the Figures by the reference numeral 802.

In this embodiment, the beam diameter 802 is greater than or equal to the diameter 608 of the central sensor 600.

As shown in FIG. 8, the spot 800 may be displaced from a centre of the front surface of the multifunctional sensor 504.

At step s6, each of the sensors 600, 601-604 of the multifunctional sensor 504 measures a power (or intensity, or some other characteristic) of the focussed beam 512 incident on that sensor 600, 601-604.

If the spot 800 is displaced from a centre of the front surface of the multifunctional sensor 504, the spot 800 may overlap with one or more of the quadrant sensors 601-604 to a greater or lesser extent compared to one or more different quadrant sensors 601-604. Thus, the power measured by one or more of the quadrant sensors 601-604 may be different from that measured by one or more different quadrant sensors 601-604. For example, as shown in FIG. 8, the spot 800 overlaps the first quadrant sensor 601 to a greater extent than it overlaps the fourth quadrant sensor 604. Thus, the first quadrant sensor 601 measures a higher power than the fourth quadrant sensor 604.

The central sensor 600 measures the focussed beam 512 incident on it, thereby determining the communications data.

At step s8, each of the sensors 600, 601-604 of the multifunctional sensor 504 sends its power measurement to the controller 508.

At step s10, the controller 508 determines a displacement of the spot 800 from the centre of the front surface of the multifunctional sensor 504.

In this embodiment, the displacement (normalised to 1) of the spot 800 from the centre of the front surface of the multifunctional sensor 504 in the direction of the y-axis 804 is determined using the following formula:

$$D_y = \frac{((P_1 + P_2) - (P_3 + P_4))}{(P_1 + P_2 + P_3 + P_4)}$$

where: $D_y$ is the y-displacement of the spot 800;
$P_1$ is the power measurement of the first quadrant sensor 601;
$P_2$ is the power measurement of the second quadrant sensor 602;
$P_3$ is the power measurement of the third quadrant sensor 603; and
$P_4$ is the power measurement of the fourth quadrant sensor 604;

In this embodiment, the displacement (normalised to 1) of the spot 800 from the centre of the front surface of the multifunctional sensor 504 in the direction of the x-axis 806 is determined using the following formula:

$$D_x = \frac{((P_2 + P_4) - (P_1 + P_3))}{(P_1 + P_2 + P_3 + P_4)}$$

where: $D_x$ is the x-displacement of the spot 800.

In this embodiment, the controller 508 implements a tracking control algorithm to continuously or periodically update the power of the spot 800 detected by each of the quadrant sensors 601-604 of the multifunctional sensor 504. Using this information, the controller 508 continuously or periodically determines the offset error of the spot 800 from the centre of the multifunctional sensor 504. The controller 508 may determine the position of the spot 800 on the front surface of the multifunctional sensor 504 instead of or in addition to determining e offset error of the spot 800 from the centre of the multifunctional sensor 504.

At step s12, using the information determined at step s10, the controller 508 continuously or periodically controls the fixture 506.

In this embodiment, the controller 508 uses the computed x- and y-displacements to determine a corrective pan/tilt movement 514, 516 for the fixture 506 to cause the focussed beam 512 to be focussed at the centre of the multifunctional sensor 504 (i.e. to cause the spot 800 to be moved to the centre of the central sensor 600). This process may be referred to as centroiding. The controller 508 then controls the fixture 506 to move according to the determined pan/tilt movement 514, 516, thereby causing the spot 800 to be moved to the centre of the central sensor 600.

Thus, the fixture 506 is continuously or periodically controlled to such that the central sensor 600 receives an optical signal (i.e. the focussed beam 512) at a substantially optimum position, thereby improving communications and reducing signal drop out.

Thus, an optical communications process implemented by the FSO receiver system 500 is provided.

Advantageously, the above described system and method tends to avoid the use of an angle-of-arrival sensor that is separate from the optical communications data sensor. Consequently, the size, weight, and complexity of an FSO receiver system tend to be reduced.

Figure 1:
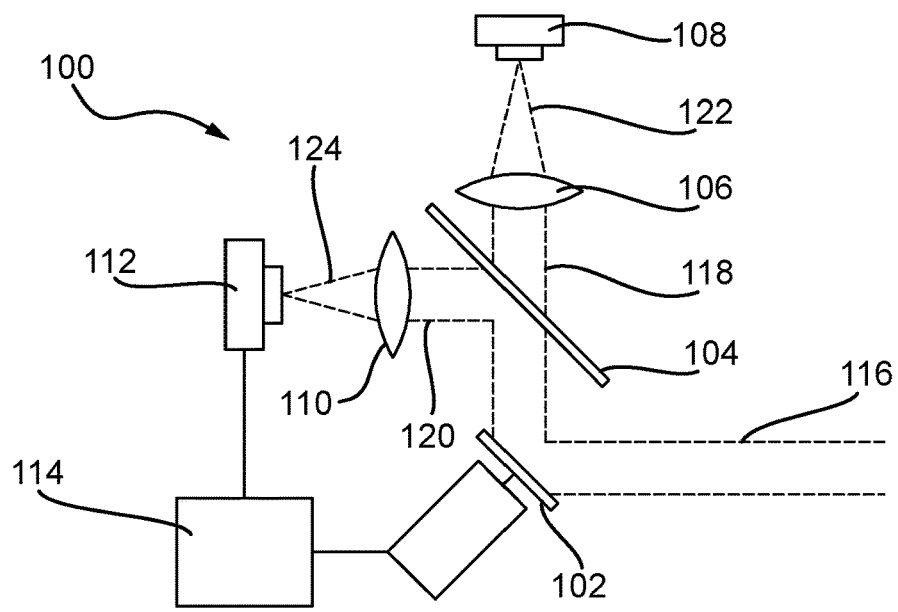
FIG. 1 is a schematic illustration (not to scale) showing a first example FSO receiver system.
Figure 2:
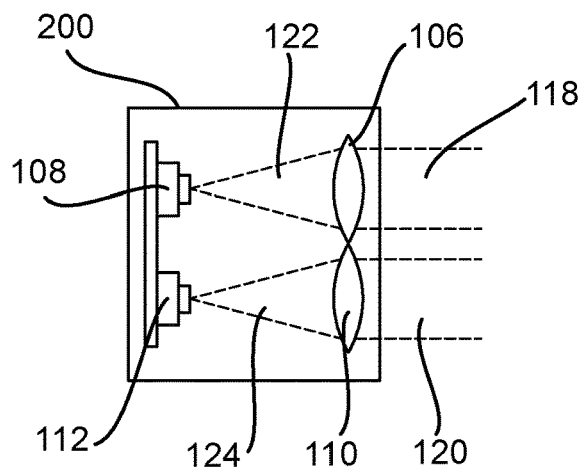
FIG. 2 is a schematic illustration (not to scale) showing a top view of a second example FSO receiver system.
Figure 3:
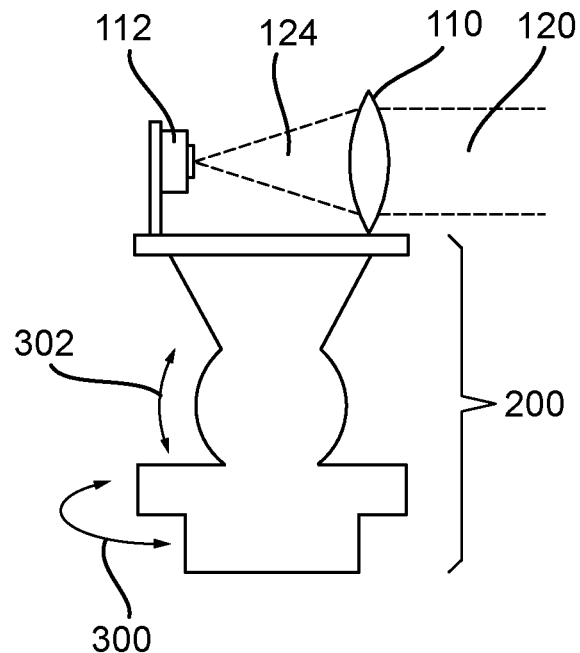
FIG. 3 is a schematic illustration (not to scale) showing a side view of the second example FSO receiver system.
Figure 4:
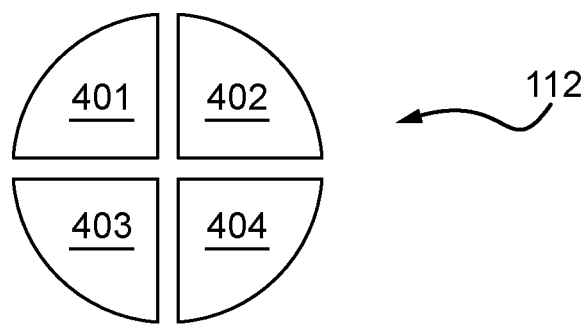
FIG. 4 is a schematic illustration (not to scale) showing a front surface of a quad tracking sensor.

It should be noted that certain of the process steps depicted in the flowchart of FIG. 3 and described below may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the beam diameter 802 is greater than or equal to the diameter 608 of the central sensor 600. However, in other embodiments, the beam diameter is less than the diameter of the central sensor.

In the case where the beam diameter 802 is substantially equal to the diameter 608 of the central sensor 600, there tends to be the peripheral Gaussian tail (approximately 14% of the incoming beam power) incident on the one or more of the four quadrant sensors 601-604. This fraction is similar to a standard system in which typically 10% of the incoming light is tapped for the angle-of-arrival sensor.

Figure 9:
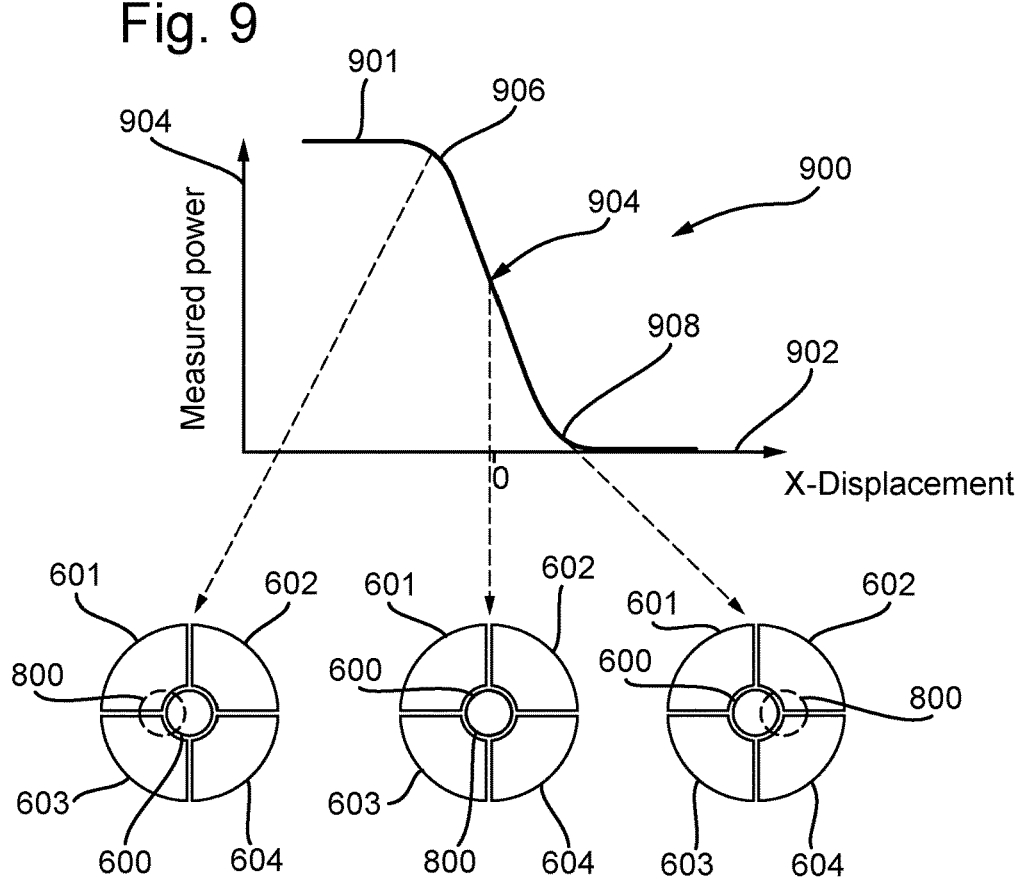
FIG. 9 is a schematic illustration (not to scale) showing a graph.

FIG. 9 is a schematic illustration (not to scale) showing a first graph 900. The first graph 900 illustrates a typical relationship 901 between the x-displacement of the spot 800 from the centre of the front face of the multifunctional sensor 504 and a power measured by the quadrant sensors 601-604. The x-axis 902 of the graph 900 shows the x-displacement of the spot 800 from the centre of the front face of the multifunctional sensor 504. The y-axis 904 of the graph 900 shows the power measured by the quadrant sensors 601-604.

In this embodiment, there is a similar relationship between the y-displacement of the spot 800 from the centre of the front face of the multifunctional sensor 504 and a power measured by the quadrant sensors 601-604 to that illustrated in FIG. 9.

In this embodiment, the relationship 901 comprises a central region 904 where the relationship 901 between the offset and the measured power is linear. In this central region 904, the control algorithm implemented by the controller 508 can apply a corrective movement to the fixture 506 which is directly proportional to the calculated offset error in order to re-centre the spot 800 at the centre of the front face of the multifunctional sensor 504.

However, beyond this central region 904, there are non-linear regions 906, 908 of the relationship 901. These non-linear regions 906, 908 correspond to relatively large x-deviations of the spot 800 of the front face of the multifunctional sensor 504, as illustrated in FIG. 9 by the depictions of the multifunctional sensor 504 and the spot 800 below the graph 900. In these non-linear regions 906, 908 there tends to be uncertainty on how much corrective movement for the fixture 506 is required to re-centre the spot 800.

In some embodiments, the tracking algorithm implemented by the controller 508 may take into account the non-linear regions 906, 908. For example, in some embodiments, the tracking algorithm takes into account past error values by including an integral term which is proportional to both the magnitude of the error and the duration of the error. Also for example, in some embodiments, the tracking algorithm includes a derivative term to predict a future value of the error based on a current rate of change. This later example tends to be of particular use where the system has a systematic incremental error which accumulates over time.

For a multifunctional sensor 504 having a central sensor 600 having a 0.4 mm diameter, the linear central region 904 may extend over, for example, a region having a diameter of about 135 μm. For the multifunctional sensor 504 having an angular Field of View (FoV) of 2°, this equates to about 0.6°. In this case, the power incident on the central sensor 600 within the linear central region 904 tends to be greater than or equal to 80% of the power of the light beam 510.

Outside the linear central region 904 the offset error of the spot 800 may be uncertain. However, advantageously, the power measurements of the quadrant sensors 601-604 tend to provide enough information to enable the controller 508 to control the fixture 506 to move the spot 800 a predetermined distance towards the centre of the front face of the multifunctional sensor 504 at each update. In some embodiments, the predetermined distance (i.e. an incremental angular step) may be 0.1°. Thus, the linear central region 904 may be equivalent to 6 incremental steps.

In some embodiments, a tracking algorithm is implemented within the non-linear regions 906, 908 to move the spot 800 a predetermined distance towards the centre of the front face of the multifunctional sensor 504. In some embodiments, once the spot 800 is approximately centred (for example, when the spot is in the linear central region), the tracking algorithm may switch to an algorithm which applies a corrective movement to the fixture 506 which is directly proportional to the calculated offset error to maintain beam alignment.

For example, for a case where the outer diameter 606 of the four quadrature sensors 601-604 is 1.6 mm and the diameter 608 of the central sensor 600 is 0.4 mm, the full angular coverage of the quadrature sensors 601-604 may be approximately 8°. For 0.1° incremental angular steps and a 50 Hz update rate, the controller 508 may incrementally move the fixture 506 so that the spot 800 is moved from at or proximate to the outer edge of the multifunctional sensor 504 to approximately the centre of the multifunctional sensor 504 in under one second. Once the spot 800 has been centred, the algorithm may then be implemented to maintain beam alignment for relative angular velocities of up to 5°/s.

In some embodiments, larger incremental steps (e.g. 0.3° incremental steps as opposed to 0.1° incremental steps) may be implemented within the non-linear regions 906, 908. In some embodiments, once operating in the central linear region 906, 908, an adaptive control algorithm may reduce the incremental step size to a smaller value (e.g. from 0.3° back to 0.1°). This tends to provide for quicker beam centring.

Advantageously, faster system updating tends to provide for quicker beam centring.

Advantageously, by increasing the outer diameter 606 of the quadrant sensors 601-604, data acquisition over a wider range of angles tends to be enabled. For example, quadrant sensors having a 25 mm outer diameter tend to provide a 90° angular coverage.

In some embodiments, the incoming light beam 510 is substantially stationary. This tends to facilitate beam centring.

In some embodiments, the beam diameter 802 is greater than the diameter 608 of the central sensor 600. In some embodiments, For example, the beam diameter 802 is substantially equal to 1.66 multiplied by the diameter 608 of the central sensor 600. In this case, the power of the spot 800 on the central sensor 600 when the spot 800 is centred is 50% of the total power of the beam. Thus, 50% of the total power of the spot 800 is incident on the quadrant sensors 601-604. In this case the linear central region 904 tends to extend over approximately 0.3 mm, corresponding to an approximately 1.5° FoV. In this case, while there tends to be less incident power available for the central sensor 600 (i.e. the communications detector), more power tends to be available for use by the quadrant sensors 601-604 and thus for tracking purposes. Thus, beam alignment tends to be facilitated by the larger beam diameter 802.

Advantageously, the size of the beam diameter 802 can be varied to tune the system to particular operational requirements. The size of the beam diameter 802 can be varied by, for example, varying characteristics of the focussing lens 502, or for example a relative distance between the focussing lends 502 and the multifunctional sensor 504.

In the above embodiments, the controller uses the power measurements of the quadrant sensors to control pan/tilt movement of the fixture. However, in other embodiments, the controller may use the power measurements of the quadrant sensors to control a different entity to centre the light beam on the multifunctional sensor. For example, in some embodiments, the controller may move the multifunctional sensor relative to the focussing lens. Also for example, in some embodiments, the controller may move or deform the focussing lens relative to the multifunctional sensor.

In the above embodiments, the FSO comprises a focussing lens and a fixture. However, in some embodiments, the fixture may be omitted. For example, the fixture may be replaced by apparatus for moving the multifunctional sensor with respect to the incoming light beam. In some embodiments, the focussing lens may be omitted. For example, in some embodiment, the incoming light beam is not focussed.

In the above embodiments, the focussing lens is a single-focal lens. However, in other embodiments, the focussing lens is a different type of lens, for example, a bi-focal lens. In some embodiments, a Fresnel lens, a diffractive lens, a holographic element, a combination of both refractive and diffractive lenses, and/or a Kinoform may be used instead of or in additional to a single-focal lens and/or a bi-focal lens.

What will now be described is an embodiment of the FSO receiver system in which a symmetric bi-focal lens is implemented.

Figure 10:
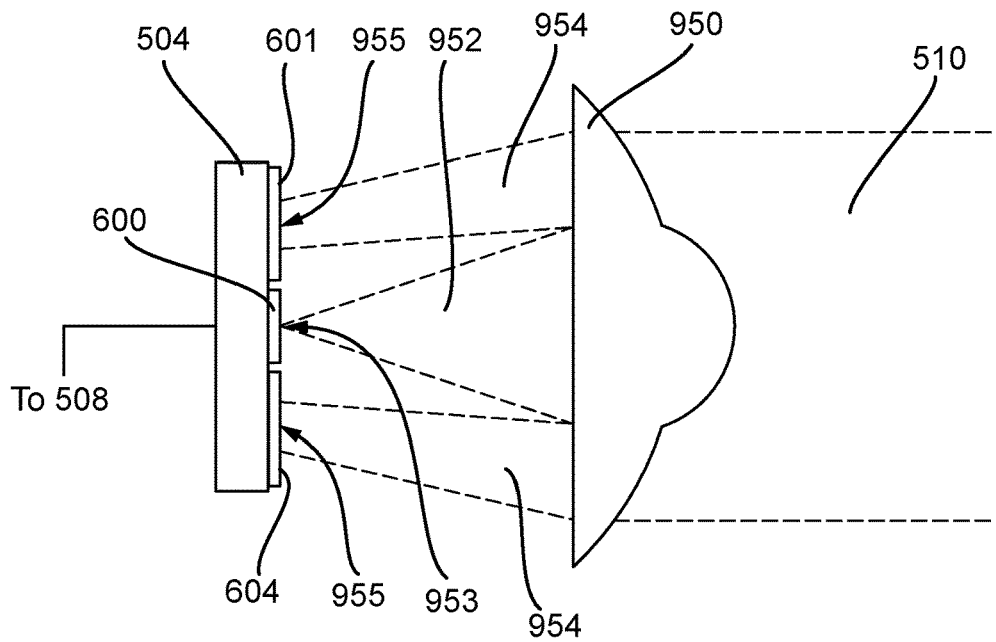
FIG. 10 is a schematic illustration (not to scale) showing a portion of an FSO receiver system comprising a symmetric bi-focal lens.

FIG. 10 is a schematic illustration (not to scale) showing a portion of an embodiment of a FSO receiver system in which the focussing lens is a symmetric bi-focal lens 950.

Figure 11:
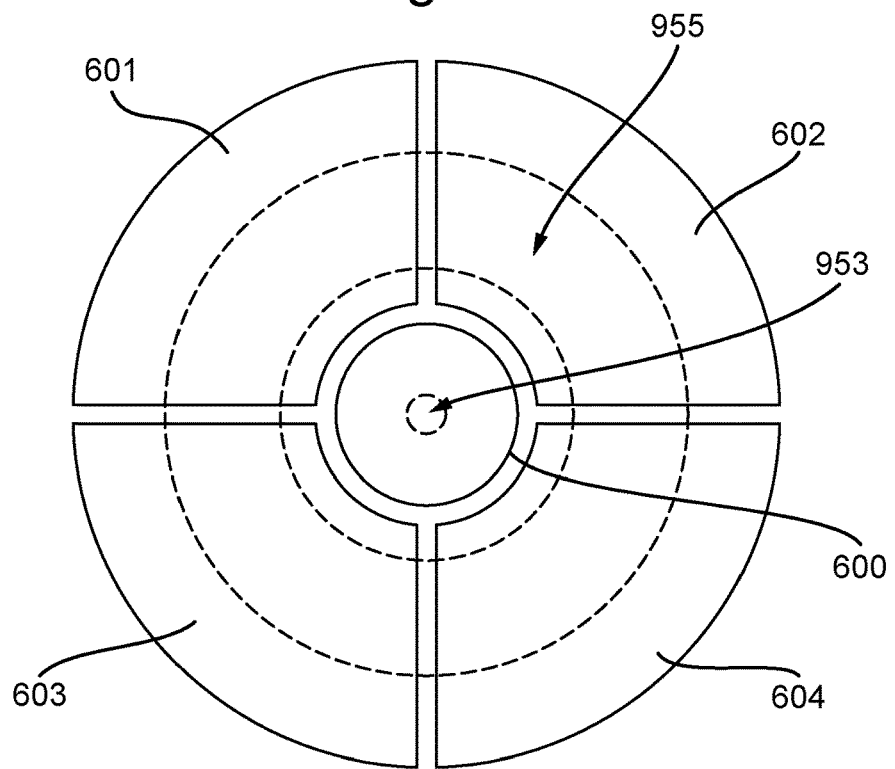
FIG. 11 is a schematic illustration (not to scale) showing the front surface of the multifunctional sensor in use with the symmetric bi-focal lens.

FIG. 11 is a schematic illustration (not to scale) showing the front surface, or focal plane, of the multifunctional sensor 504 and the light beam 510 focussed thereon by the bi-focal lens 950.

In some embodiments, preferably the central communications sensor of the multifunctional sensor is relatively small. This tends to allow for high bandwidths to be realised. For example, a 400 µm diameter silicon central sensor tends to provide for communications bandwidths up to the order of 1 GHz. Using a spot diameter that substantially matches the diameter of the central sensor tends to provide that ~90% of the power of the incident light is incident on the central sensor. However, this tends to offer only a very narrow linear region for the angle-of-arrival portion of the multifunctional sensor (i.e. for the quadrant sensors). The symmetric bi-focal lens 950 can be used to address this issue.

In this embodiment, a central portion of the symmetric bi-focal lens 950 focuses a central portion of the incident light beam 510 (thereby to produce a central focussed beam 952) onto the central sensor 600. The central focussed beam 952 appears as a central spot 953 on the central sensor 600.

Also, an outer region of the symmetric bi-focal lens 950 (which surrounds the central portion of the symmetric bi-focal lens 950) focuses an outer portion of the incident light beam 510 (thereby to produce an outer focussed beam 954) onto the quadrant sensors 601-604. The outer focussed beam 954 appears as an annulus 955 on the quadrant sensors 601-604 surrounding the central spot 953. Power measurements of outer focussed beam 954 by the quadrant sensors 601-604 can be used for angle-of-arrival sensing and beam centring as described in more detail earlier above.

Advantageously, the symmetric bi-focal lens 950 can be designed such that the relative sizes of the central portion and outer region of the symmetric bi-focal lens 950 provide a desired split of the incoming light beam 510 between the central sensor 600 and the quadrant sensors 601-604. For example, the outer lens region can be designed to provide an annulus 955 whose width is equal to half the diameter of the central sensor 600. This tends to ensure that the desired split is maintained over the whole of the linear region 904.

Advantageously, the symmetric bi-focal lens can be designed to tune the FSO receiver system to particular operational requirements.

Advantageously, it tends to be possible to design the symmetric bi-focal lens 950 to provide any appropriate size of central spot 953. Similarly, it tends to be possible to design the symmetric bi-focal lens to provide any appropriate size of annulus 955. A larger central spot 953 on the central sensor 600 tends to provide gentler and more predictable roll-off of incident power with angle of incident light. This tends to enable the FSO receiver system to adapt the bandwidth in real time, rather than suffer drop-outs.

In some embodiments, the focussing lens element of the FSO receiver system is programmable and/or adaptive. This tends to enable the split of the incident optical signal between the central sensor and angle-of-arrival sensor (i.e. the quadrant sensors) to be varied in real time to optimise instantaneous performance. The programming of the lens element may be performed by the controller based on power measurements taken by the quadrant sensors.

The invention claimed is:

1. A free space optical communication system receiver comprising:
    a central optical sensor;
    a plurality of further optical sensors around a peripheral edge of the central optical sensor;
    a means for moving the free space optical communication system receiver relative to an optical signal incident on the free space optical communication system;
    a controller configured to, using measurements of the incident optical signal by the plurality of further optical sensors, control the means so as to move the free space optical communication system receiver relative to the incident optical signal; and
    a bi-focal lens configured to focus the incident optical signal to produce a central focused beam onto the free space optical communication system receiver and an outer focused beam on the further optical sensors.

2. The free space optical communication system receiver according to claim 1, wherein the plurality of further optical sensors are uniformly spaced apart around the peripheral edge of the central optical sensor.

3. The free space optical communication system receiver according to claim 1, wherein the further optical sensors are the same size and shape as each other.

4. The free space optical communication system receiver according to claim 1, wherein the central optical sensor is circular.

5. The free space optical communication system receiver according to claim 1, wherein the further optical sensors define an annulus surrounding the central optical sensor.

6. The free space optical communication system receiver according to claim 1, wherein there are at least four further optical sensors.

7. The free space optical communication system according to claim 1, wherein:
    the means for moving the free space optical communication system receiver includes a rigid support structure rotatable about at least two perpendicular axes;
    the free space optical communication system receiver is fixedly attached to the support structure; and
    the controller is configured to, using the measurements of the incident optical signal by the plurality of further optical sensors, rotate the support structure about at least one of the axes.

8. The free space optical communication system according to claim 1, wherein the bi-focal lens includes one or more of a Fresnel lens, a diffractive lens, a holographic element, a combination of refractive and diffractive lenses, and a Kinoform.

9. The free space optical communication system according to claim 1, wherein the bi-focal lens is programmable, adaptive, or both programmable and adaptive.

10. A method of receiving an optical signal, the method comprising:
    receiving an optical signal incident on a free space optical communication system receiver, the free space optical communication system receiver including
    a central optical sensor,
    a plurality of further optical sensors disposed around a peripheral edge of the central optical sensor;
    a means for moving the free space optical communication system receiver relative to an optical signal incident on the free space optical communication system;
    a controller configured to, using measurements of the incident optical signal by the plurality of further optical sensors, control the means so as to move the free space optical communication system receiver relative to the incident optical signal; and a bi-focal lens configured to focus the incident optical signal to produce a central focused beam onto the free space optical communication system receiver and an outer focused beam on the further optical sensors;

measuring, by one or more of the further optical sensors, at least a portion of the incident optical signal; and moving the free space optical communication system receiver relative to the incident optical signal, based on the one or more measurements taken by the one or more of further optical sensors.

11. The method of receiving an optical signal according to claim 10, wherein moving the free space optical communication system receiver relative to the incident optical signal includes moving the central optical sensor towards the incident optical signal.

12. The method of receiving an optical signal according to claim 10, wherein:
the incident optical signal specifies communications data; and
the method includes measuring, by the central optical sensor, at least a portion of the incident optical signal that is further incident on the central optical sensor to determine the communications data.

13. A free space optical communication system receiver kit, the kit comprising:
a central optical sensor;
a plurality of further optical sensors configured to be disposed around a peripheral edge of the central optical sensor;
a means for moving the free space optical communication system receiver relative to an optical signal incident on the free space optical communication system;
a controller configured to, using measurements of the incident optical signal by the plurality of further optical sensors, control the means so as to move the free space optical communication system receiver relative to the incident optical signal; and
a bi-focal lens configured to focus the incident optical signal to produce a central focused beam onto the free space optical communication system receiver and an outer focused beam on the further optical sensors.

14. A free space optical communication system comprising:
a free space optical communication system receiver;
wherein the free space optical communication system receiver includes:
a central optical sensor;
a plurality of further optical sensors around a peripheral edge of the central optical sensor;
a means for moving the free space optical communication system receiver relative to an optical signal incident on the free space optical communication system;
a controller configured to, using measurements of the incident optical signal by the plurality of further optical sensors, control the means so as to move the free space optical communication system receiver relative to the incident optical signal; and
a bi-focal lens configured to focus the incident optical signal to produce a central focused beam onto the free space optical communication system receiver and an outer focused beam on the further optical sensors;
wherein the means for moving the free space optical communication system receiver includes a moveable support structure, wherein the free space optical communication system receiver is attached to the moveable support structure; and
wherein the controller is configured to control the moveable support structure so as to move the free space optical communication system receiver, wherein the movement is based on an optical signal incident on the free space optical communication system as measured by the plurality of further optical sensors.

15. The free space optical communication system according to claim 14, wherein:
the moveable support structure is rotatable about at least two perpendicular axes;
the free space optical communication system receiver is fixedly attached to the support structure; and
the controller is configured to rotate the moveable support structure about at least one of the axes based on using measurements of the incident optical signal measured by the plurality of further optical sensors.

16. The free space optical communication system according to claim 14, wherein the bi-focal lens includes one or more of a Fresnel lens, a diffractive lens, a holographic element, a combination refractive and diffractive lenses, and a Kinoform.

17. The free space optical communication system according to claim 14, wherein the lens is programmable, adaptive, or both programmable and adaptive.

* * * * *